United States Patent [19]
Young et al.

[11] Patent Number: 5,665,488
[45] Date of Patent: Sep. 9, 1997

[54] METHOD OF MAKING A BATTERY SEPARATOR AND THE BATTERY SEPARATOR PRODUCED THEREBY

[75] Inventors: James Young, Sunriver; Gregory T. Humphrey, Albany; Daniel K. Lee, Lebanon, all of Oreg.

[73] Assignee: AMTEK Research International LLC, Eugene, Oreg.

[21] Appl. No.: 515,855

[22] Filed: Aug. 16, 1995

[51] Int. Cl.$^6$ .................................................. H01M 2/18
[52] U.S. Cl. ............................ 429/143; 429/146; 429/147
[58] Field of Search ................................ 29/623.3, 623.5; 429/129, 143, 146, 147, 249; 264/134, 136, 241

[56] References Cited

U.S. PATENT DOCUMENTS

| | | | |
|---|---|---|---|
| 1,295,660 | 2/1919 | Willard | 429/143 |
| 2,687,446 | 8/1954 | Merrill | 429/147 |
| 3,340,100 | 9/1967 | Silvestri | 429/143 |
| 3,351,495 | 11/1967 | Larsen | 136/146 |
| 3,773,590 | 11/1973 | Morgan | 429/143 |
| 4,228,225 | 10/1980 | O'Rell | 429/147 |
| 4,482,617 | 11/1984 | Le Bayon et al. | 429/143 |

Primary Examiner—Prince Willis, Jr.
Assistant Examiner—Carol Chaney
Attorney, Agent, or Firm—Robert E. Howard

[57] ABSTRACT

A method of making a battery separator useful in flooded cell type lead acid batteries comprising providing a sheet of microporous polyolefin material having two planar surfaces, forming at least one hollow rib extending from one of the planar surfaces, and wholly or partially filling the hollow rib with a rib core material. The forming of the hollow rib and the filling of the hollow rib with rib core material may be effected in separate steps or simultaneously. Where the formation and filling of the hollow rib take place simultaneously, the process involves applying at least one bead of a rib core material to one planar surface of the sheet of microporous polyolefin material, pressing the bead of rib core material into said microporous polyolefin sheet to thereby displace the microporous polyolefin material located thereunder outwardly from the other planar surface to thereby form a rib member projecting from said other planar surface. The separator thus produced is a sheet of microporous polyolefin material having at least one rib projecting from one planar surface thereof, the rib having an outer surface of the microporous polyolefin material and a core of a rib core material. The microporous polyolefin material is preferably microporous polyethylene. The rib core material is a polymeric material selected from the group consisting of thermoplastics, thermosetting polymers and reactive hot melts.

9 Claims, 2 Drawing Sheets

METHOD OF MAKING A BATTERY SEPARATOR AND THE BATTERY SEPARATOR PRODUCED THEREBY

BACKGROUND OF THE INVENTION

This invention relates to a battery separator for use in flooded cell type lead acid batteries, and to a method for making the battery separator.

In flooded cell type lead acid batteries the positive and negative plates are separated by a battery separator. The battery separator currently used by most flooded cell type lead acid battery manufacturers is of the microporous polyolefin type. This type of separator has a composition consisting essentially of a polyolefin (preferably a high molecular weight polyolefin such as an ultra-high molecular weight polyethylene ("UHMW PE")), a filler such as an amorphous silica and a plasticizer such as a processing oil, together with certain minor ingredients such as an antioxidant, lubricant and carbon black.

Microporous polyolefin separator material is commercially manufactured by passing the ingredients through a heated extruder, passing the extrudate generated by the extruder through a die and into the nip formed by two heated calender rolls to form a continuous web, extracting a substantial amount of the processing oil from the web by use of a solvent, drying the extracted web, slitting the web into lanes of predetermined width, and winding the lanes into rolls.

Such separators and a method of manufacturing them are described in U.S. Pat. No. 3,351,495.

Microporous polyolefin battery separators typically have a configuration comprising a backweb having a predetermined thickness, and parallel ribs spaced apart a predetermined distance extending outwardly from one planar surface of the backweb. The ribs extend continuously in a longitudinal direction parallel to the edges of the separator material. The thickness of the backweb and height and spacing of the ribs is specified by the battery manufacturer to maximize desired battery characteristics. Electrolyte is contained in the space formed by the ribs, backweb and the plate contacted by the ribs, and a certain amount is contained in the pores of the separator material itself and in the active material of the plates.

Such ribs are formed during manufacture of the microporous polyethylene separator by providing that one of the two heated calender rolls is engraved with grooves so that the ribs are formed as an integral part of the web produced by the calender.

There are many different specifications required by battery manufacturers relative to backweb thickness, rib size, rib spacing and width of the rolled up separator material. In manufacturing the separator material, frequent changes of the engraved roll are required to meet different customer requirements. Such changes require that the manufacturing line be shut down. Thus, valuable manufacturing time is lost, and waste scrap is generated during start-up of the line with a new engraved roll.

It is an object of this invention to provide a new method of applying ribs to a microporous polyolefin separator that minimizes lost manufacturing time and scrap generation created by changing engraved calender rolls. It is a further object to provide a new configuration of microporous polyolefin separator material.

SUMMARY OF THE INVENTION

This invention relates to a method of forming a microporous polyolefin battery separator from a sheet of microporous polyolefin having first and second planar faces by applying beads of rib core material to one planar face of the sheet at predetermined locations, and pressing the beads of rib core material into the sheet in a manner to cause the beads to displace the microporous polyolefin outwardly from the other planar surface of the sheet to thereby form ribs having an outer surface comprised of microporous polyolefin and a core comprised of the rib core material.

Alternatively, the separator of this invention may be formed by first forming hollow ribs by displacing microporous polyolefin outwardly from one planar face by forcing a rigid member against the opposite planar face and subsequently filling the hollow ribs with a suitable rib core material.

The invention also relates to a battery separator comprising a sheet having two planar faces formed of microporous polyolefin material with at least one rib member extending from one of the planar surfaces, the rib member having an outer surface comprised of the microporous polyolefin material and an inner core of a polymeric rib core material.

DESCRIPTION OF PREFERRED EMBODIMENTS

Figure 1:
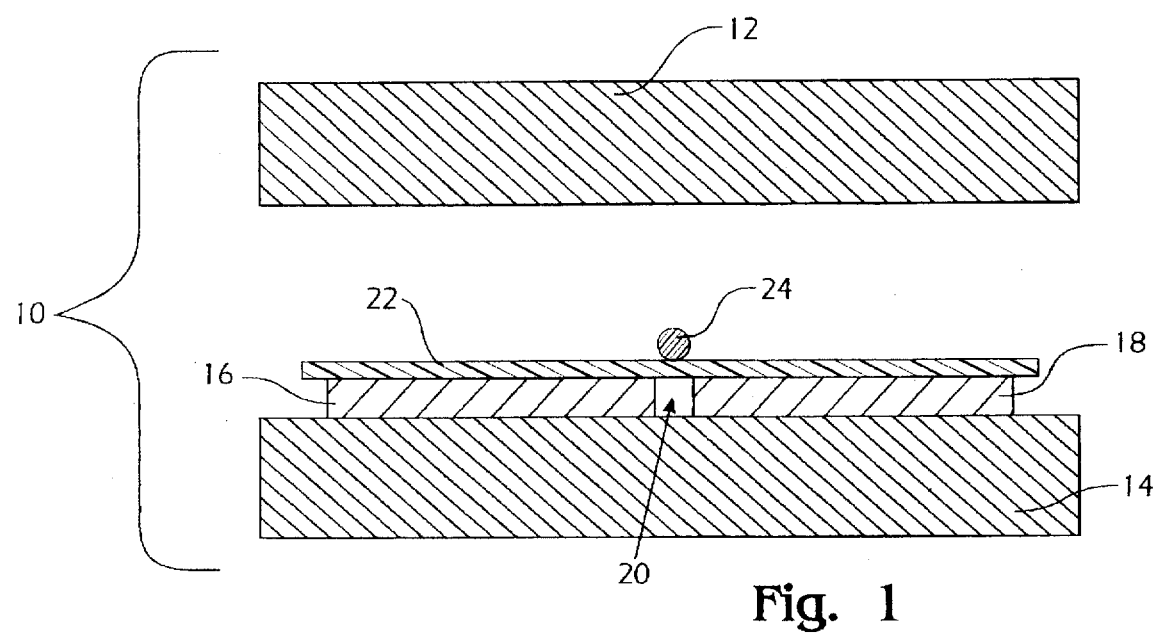
FIG. 1 is a schematic view of a discontinuous press suitable for practicing the process of this invention.

The microporous polyolefin sheet used in this invention may be formed from any of the compositions and by the processes described above, including the description contained in U.S. Pat. No. 3,351,495 whose entire disclosure is incorporated herein by reference.

The preferred microporous polyolefin sheet is formed from UHMW PE and has a composition comprised of about 15% to about 40% by weight UHMW PE, about 60% to about 80% by weight amorphous silica, about 0% to about 25% by weight processing oil together with a minor (total of less than about 2% by weight) of a lubricant, antioxidant, and carbon black.

The microporous polyolefin sheet preferably has a thickness of between about 3 mils and about 15 mils, most preferably between about 5 mils and about 10 mils.

The rib core material may be any material which will not be detrimental to the operation of a flooded cell lead acid battery. The core material is polymeric and may be preformed into filaments of predetermined shape prior to application to one planar face of the microporous polyolefin sheet, or may be applied to the sheet as an extrudate or hot melt.

The core material may be a combination of polymeric material and fillers. The fillers may be particles or fibers.

The core material may be a polymeric material alone, a pollymeric material with a filler or fillers, or a foamed polymeric material with or without filler or fillers.

The rib core polymeric material may be thermoplastic or thermosetting. Reactive hot melts are also suitable. The rib core material may be employed with or without additives that enhance adhesive properties.

Suitable thermoplastic core materials include polyolefins, polyamides and styrene homopolymers and copolymers. The polyolefins may be crystalline or amorphous. An example of a suitable amorphous polyolefin is an amorphous polypropylene manufactured by H. P. Fuller and sold under the trademark HL 5111-X.

Suitable thermosetting core materials include: unsaturated polyesters (the polycondensation products of dicarboxylic acids such as maleic and fumaric with dihydroxy alcohols such as ethylene, propylene, diethylene and dipropylene glycols); saturated polyesters (such as polyethylene terephthalate, polybutylene terephthalate or copolyesters produced by the condensation of more than one dibasic acid and glycol); and polyurethanes.

Reactive hot melts that may be used as the rib core material includes those based on methylene bis phenyl diisocyanate.

The pressures required to form the ribs of this invention depends upon the specific core material chosen, and a satisfactory pressure can be easily determined for a particular core material by trial and error. In general, a satisfactory pressure will be in the range of about 50 psig to about 550 psig.

The pressing step may take place at ambient temperatures or elevated temperatures, depending on the core material selected. The temperature selected will depend upon the exposure time of the microporous polyolefin to the temperature. Temperatures may range between ambient to slightly above the melting point of the microporous polyolefin where exposure times are short (less than about 5 seconds).

As previously stated, rib size and spacing are determined by the battery manufacturer to optimize certain characteristics of the battery to be built. In general, however, rib height will range between about 0.024 inch and about 0.070 inch, and rib width will range between about 0.015 inch and about 0.030 inch. Spacing of the ribs and rib size may not be uniform across the width of the separator material. In some instances ribs are placed closer together at the edges of the separator.

Although it is preferred that the ribs be continuous the ribs may be discontinuous. The ribs may run parallel to the longitudinal edges of the separator or they may run diagonally. The ribs may be straight or some other geometric shape, such as sinusoidal. The ribs may be substantially rectangular in cross section or some other suitable geometric shape.

The method of forming the separators of this invention starts with a microporous polyolefin web.

In one method of producing the separators of this invention a plurality of beads of a rib core material are applied to one planar surface of the web of microporous polyolefin. The beads are preferably applied in continuous rows parallel to the longitudinal edges of the microporous polyolefin web. The web with the plurality of beads is placed in contact with a first solid surface (such as a roll) containing grooves with the beads in alignment with the grooves and with the beads being located on the planar face of the web opposite that planar face in contact with the solid surface containing the grooves. The grooves are in the shape of the rib to be formed and, therefore, act as a mold cavity into which the microporous polyolefin is pressed. A second solid surface (such as a roll) is brought into contact with the planar face of the web to which the beads of rib core material have been applied. The second solid surface is located a distance from the first solid surface such that when it is brought into contact with the beads the beads are pressed into the microporous polyolefin sheet thereby displacing microporous polyolefin material lying immediately thereunder and, to some extent, microporous polyethylene material lying adjacent the area containing the rib core material. The rib core material pushes the microporous polyethylene material into the grooves of the first solid surface where it is molded into the shape of the groove, i.e., the shape of the ribs. The result is an essentially solid rib having an exterior surface comprised of microporous polyolefin and an interior comprised of the rib core material.

A second method of producing the separators of this invention involves first forming a hollow rib structure by placing the microporous polyolefin sheet over a female groove where the rib is to be formed and pressing the microporous sheet into such groove by forcing a male member that substantially mates with the groove into the planar surface of the sheet opposite that planar surface in contact with the surface containing the groove. After the hollow rib is formed it is wholly or partially filled with a polymeric rib core material by any suitable method, including coating and laminating.

An alternative to the above described second method is to form the hollow rib structure by pressing the microporous sheet with a first male member into a first female groove that has a depth less than the preselected height desired in the final rib structure, wholly or partially filling the hollow rib with a polymeric rib core material by any suitable method, placing the exterior surface of the filled rib in alignment with a second female groove that has a depth greater than said first female groove, and pressing the filled rib structure into said second female groove by forcing a second male member into the rib core material contained in the interior of the rib whereby a rib of preselected height is formed.

Although the microporous polyolefin sheet is preferably flat on both planar surfaces, it is contemplated that some ribs may be formed on one or both planar faces during calendering, as described above relative to the prior art, with the remainder of the ribs formed as disclosed herein.

The grooved surface which molds the microporous polyolefin material into ribs is preferably a roll, but may be flat such as a continuous belt of stainless steel. The pressing action is accomplished, in the case where the grooved surface is a roll, by a second roll spaced apart from the grooved roll, or, where the grooved surface is a continuous belt, by a second continuous belt or series of rolls spaced apart from the grooved surface.

FIG. 1 generally illustrates a discontinuous press useful in practicing this invention. Press 10 has an upper platen 12 and lower platen 14. Pieces of shim stock 16 and 18 are placed upon lower platen 14 in such a spaced relationship as to form a groove 20.

In operation, the press is heated to a predetermined temperature and a sheet of microporous polyolefin 22 is placed upon shim stock pieces 16 and 18. In one method of forming the separator of this invention, a bead of a rib core material 24, illustrated in FIG. 1 as being approximately circular in cross section, is placed upon the upper planar face of microporous polyolefin sheet 22 in alignment with the area of the groove 20. Such a bead 24 may be applied as a preformed bead (e.g. as a filament) or extruded directly onto the upper planar surface of sheet 22. Upper platen 12 is then lowered and the bead 24 pressed into microporous polyolefin sheet 22 to thereby displace and force microporous polyolefin material into groove 20. The press 10 is then opened and the resultant separator 30 (as illustrated in FIG. 2) removed.

In a second method of forming the separator of this invention, a rigid member in the shape of bead 24 is substituted therefore, and upper platen 12 is lowered onto such rigid member to thereby displace and force microporous polyolefin material into groove 20. The press 10 is then opened and a separator sheet with a hollow rib removed. The rib is subsequently wholly or partially filled with polymeric rib core material.

Figure 2:
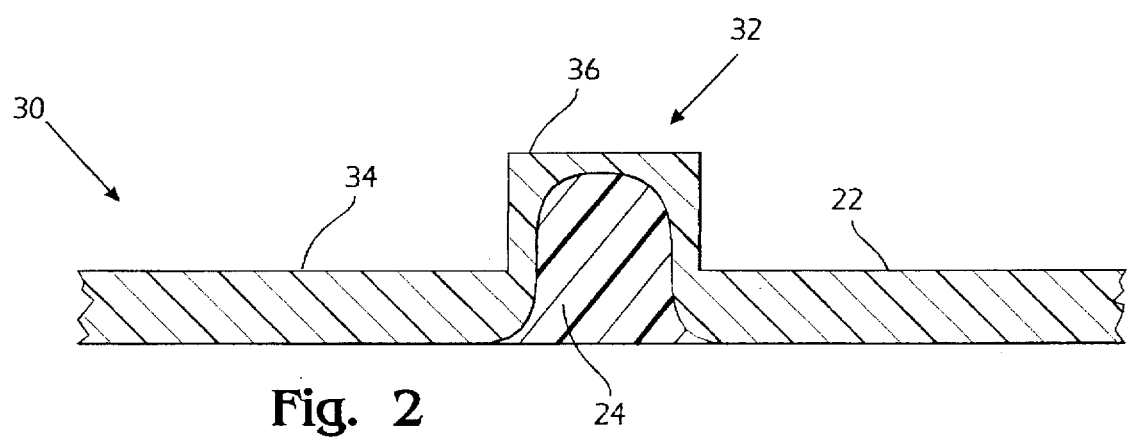
FIG. 2 is a fragmentary schematic view of the battery separator material of this invention.

As illustrated in FIG. 2, separator 30 is comprised of the microporous polyolefin sheet 22 which now forms the backweb, and a rib 32 extending from the upper surface 34 of separator 30. Although only a single rib is illustrated to simplify the disclosure, a plurality of such ribs would be formed in a commercial separator. Rib 32 is comprised of microporous polyolefin on the exterior surface 36 thereof and the rib core material 24 on the interior thereof.

Figure 3:
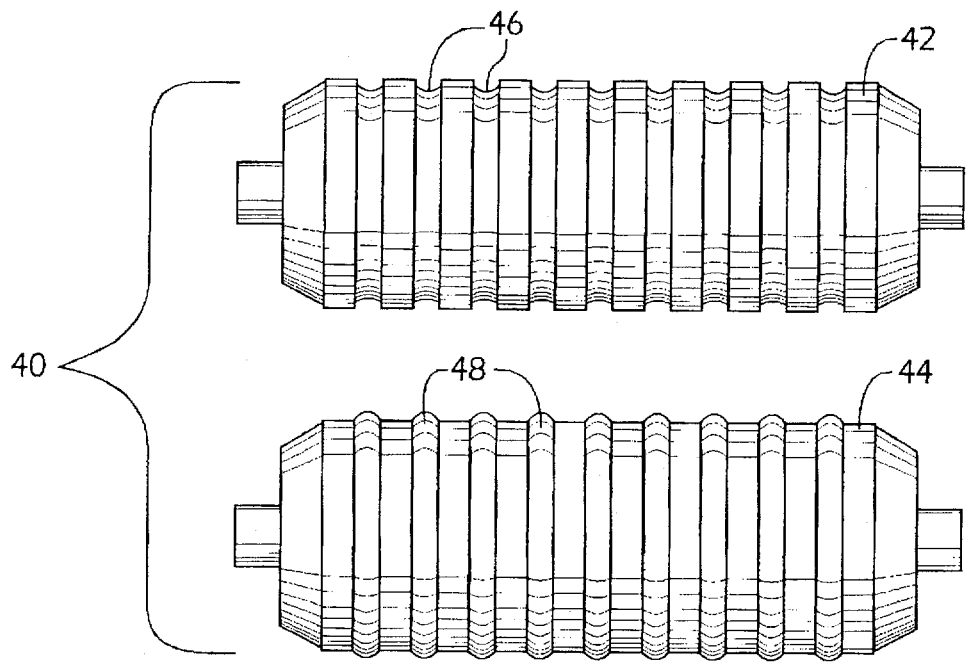
FIG. 3 is a schematic view of a continuously operating embossing type press for practicing the process of this invention.

FIG. 3 illustrates a continuous press 40 operating on an embossing principal that is useful in practicing the process of this invention. Continuous press 40 is comprised of a female roll 42 and a male roll 44. Female roll 42 has a plurality of grooves 46 and male roll 44 has a plurality of ribs 48 which mate with grooves 46 when the two rolls 42 and 44 are brought into operating proximity.

Figure 4:
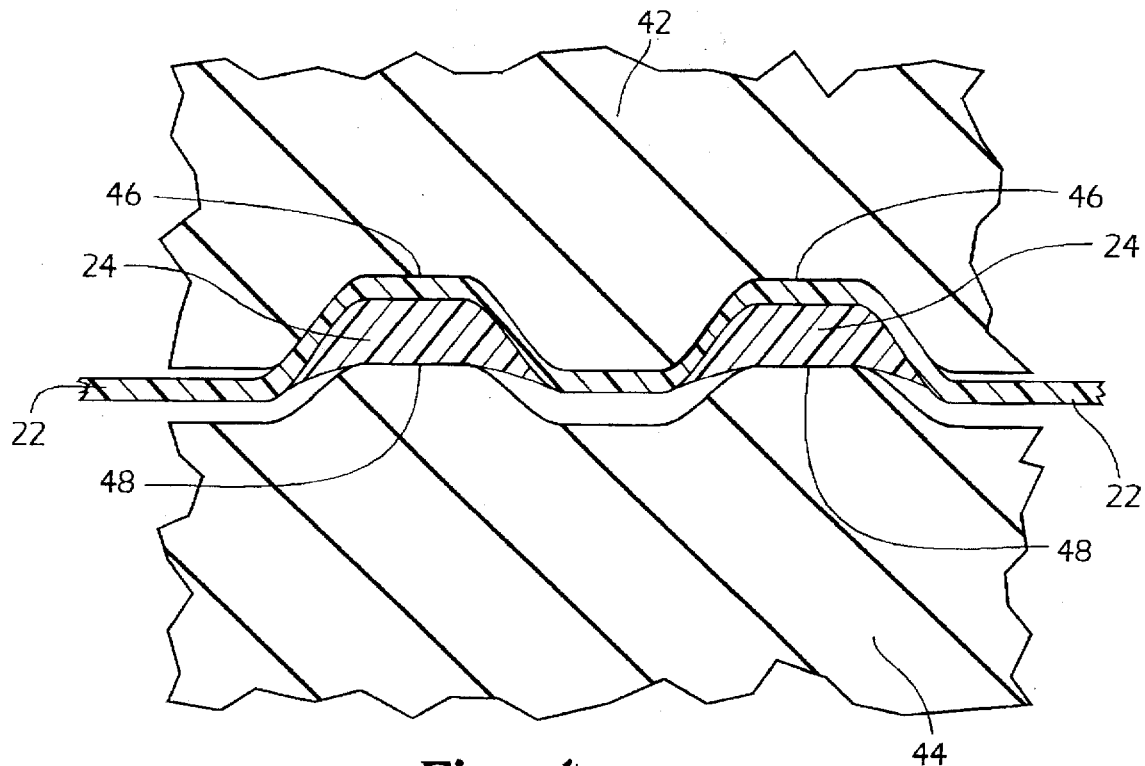
FIG. 4 is a fragmentary schematic view, enlarged, of a portion of the press of FIG. 3, illustrating rib formation.

In operation of the embodiment illustrated in FIG. 3, rolls 42 and 44 are brought into operating proximity (as illustrated in FIG. 4) and a continuous web of microporous polyolefin containing a plurality of beads of rib core material on one planar surface is passed into the nip of the female and male rolls 42 and 44, respectively. The beads are located on the surface of the web that is to be contacted by the male roll 44. The beads of rib core material are placed upon the microporous polyolefin web in alignment with the grooves 46 and ribs 48.

FIG. 4 illustrates the action of the press 40 upon the microporous polyolefin web carrying the beads of rib core material. Ribs 48 of male roll 44 press the rib core material 24 into the microporous polyolefin web 22 until the web in the area above ribs 48 comes into contact with the surface of grooves 46 of female roll 42.

The rib core material may be pressed into the microporous polyethylene web until it is flush with the non-rib side surface, as illustrated in FIG. 2, or further into the web, as illustrated in FIG. 4.

Although the continuous press illustrated in FIG. 3 is shown as having a female roll 42 and a male roll 44 with a plurality of ribs 48, a smooth roll, i.e., one having no ribs 48, may be used in place of male roll 44.

The grooves into which the microporous polyolefin sheet is pressed to form the rib can be shaped to a predetermined shape, size and spacing as in rib formation in a calender.

The rib core material may be porous, non-porous or foamed.

The rib core material may have the same composition as the microporous polyolefin sheet. In such a case, the rib core material may be formed into continuous filaments by extrusion followed by extraction of the appropriate amount of processing oil by a solvent similar to the process used in formation of the sheet material itself. The filaments would then be placed upon the sheet material and would constitute the bead of rib core material discussed above.

In the method where a hollow rib is first formed followed by filling the hollow rib with polymeric rib core material the hollow rib may be formed by other techniques than the one described above, such as by creasing or corrugating the microporous polyolefin web.

EXAMPLE

Two pieces of shim stock 0.025 inch thick were placed upon the lower platen of a laboratory size Carver press. The two pieces of shim stock were spaced apart by a distance of 0.030 inch to form a groove (as in the device illustrated in FIG. 1). The lower platen was heated to 200 degrees F. A flat sheet of microporous polyethylene separator material having no ribs on either planar surface was laid on top of the two pieces of shim stock. The microporous polyethylene material contained 18.9% by weight UHMW PE (Hostalen GUR 4152 manufactured by Hoechst), 66.5% by weight silica (Hi-Sil SBG manufactured by PPG Industries) and 12% by weight of a processing oil (Shellflex 3681 manufactured by Shell Oil Company). The flat sheet was 4 inches by 5 inches in size and 0.010 inch thick. A bead of Bostik 6363 hot melt adhesive having a diameter of about 0.030 inch was extruded from a hot melt gun directly onto the upper planar surface of the flat sheet in alignment with the groove created by the two pieces of shim stock. The press was closed and a maximum pressure of 515 psig developed for a period of 2 seconds. The press was opened and the pressed sheet removed therefrom. The downwardly facing planar surface had a rib the size and shape of the groove extending therefrom. The upper planar surface remained flat with the rib core material's outer surface being coplanar with the upper surface of the microporous polyethylene flat sheet. The flat sheet was tested for electrical resistance and the results were satisfactory.

We claim:

1. A method of forming a battery separator comprising providing a sheet of microporous polyolefin having first and second planar faces, applying at lease one bead of a rib core material on a first planar face of said flat sheet, and pressing said bead of rib core material into said flat sheet with a force and at a temperature sufficient to cause said rib core material to displace the microporous polyolefin of said flat sheet outwardly from the second planar face and to an extent such that the bead of rib core material is flush with or recessed from said second planar face to thereby form a rib extending solely from said second planar face, which said rib is comprised of an outer surface of said microporous polyolefin material and an inner core of said rib core material.

2. The method of claim 1 wherein said sheet of microporous polyolefin is placed upon a surface having a groove therein in alignment with the area of the first planar surface to which said bead of rib core material has been applied to thereby form a mold cavity into which the microporous plastic material flows upon pressing said bead of rib core material.

3. The method of claim 1 wherein said microporous polyolefin material is comprised of UHMW PE, silica and a processing oil.

4. The method of claim 1 wherein said rib core material is selected from the group consisting of thermoplastic and thermosetting polymers.

5. A method of forming a battery separator comprising providing a sheet of microporous polyolefin having first and second planar faces, forming at least one hollow rib extending from one of said planar surfaces by pressing a male member into said first planar face at a location in alignment with a female member located adjacent said second planar face, partially or wholly filling said hollow rib with a bead of rib core material, and pressing said bead of rib core material into said hollow rib to an extent such that the rib core material is flush with or recessed from said first planar face.

6. A method of forming a battery separator comprising providing a sheet of microporous polyolefin having first and second planar faces, forming at least one hollow rib extending from one of said planar surfaces by pressing a first male member into said first planar face at a location in alignment with a first female member located adjacent said second planar face, partially or wholly filling said hollow rib with a rib core material to form a precursor rib, aligning said precursor rib with a second female member, and pressing said precursor rib into said second female member with a second male member to form a final rib.

7. A battery separator consisting essentially of a single ply sheet formed of a microporous polyolefin material, said sheet having two planar surfaces, and at least one rib member extending solely from one of said planar surfaces and flush with or recessed from the other of said planar surfaces, said rib member having an outer surface comprised of said microporous polyolefin material and an inner core comprised of a rib core material.

8. The battery separator of claim 7 wherein said microporous plastic material is comprised of UHMW PE, silica and processing oil.

9. The battery separator of claim 7 wherein said rib core material is selected from the group consisting of thermoplastic polymers, thermosetting polymers and reactive hot melt polymers.

* * * * *